P. B. WALLS.
LOCK FOR GEAR LEVERS.
APPLICATION FILED JULY 28, 1911. RENEWED FEB. 18, 1915.
1,136,568.
Patented Apr. 20, 1915.
2 SHEETS—SHEET 1.
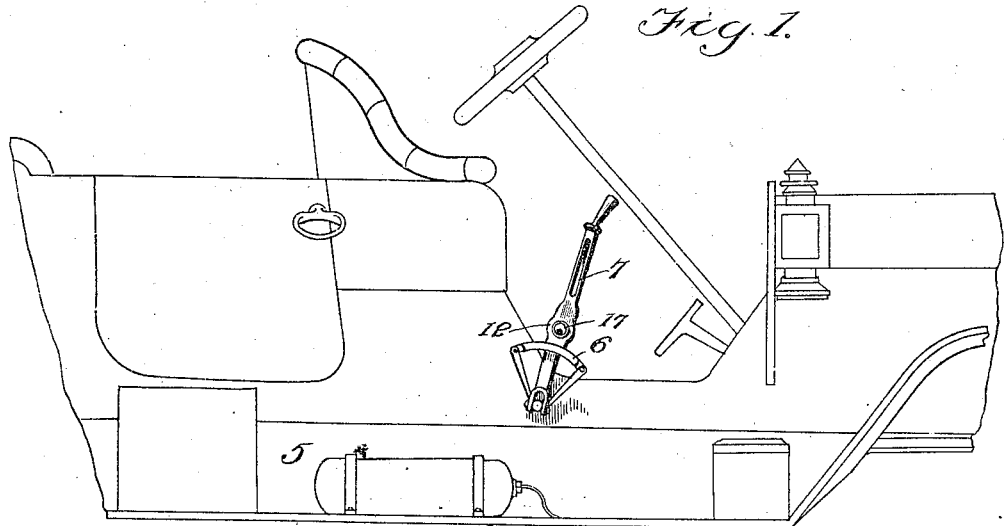
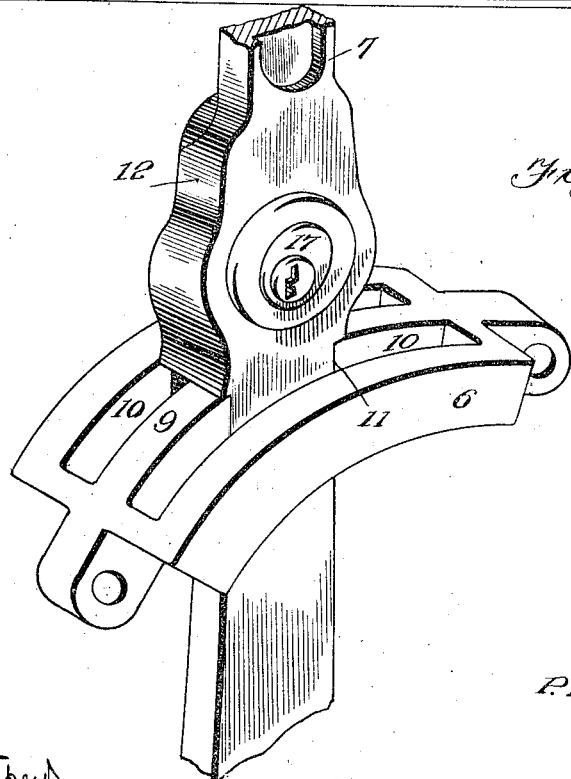
Inventor
P. B. Walls.
Witnesses
By
Attorneys.

P. B. WALLS.
LOCK FOR GEAR LEVERS.
APPLICATION FILED JULY 28, 1911. RENEWED FEB. 18, 1915.
1,136,568.  Patented Apr. 20, 1915.
2 SHEETS—SHEET 2.
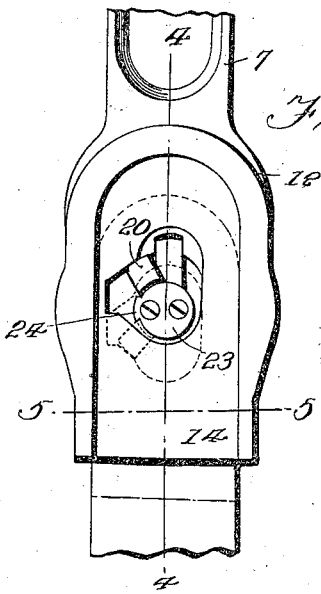
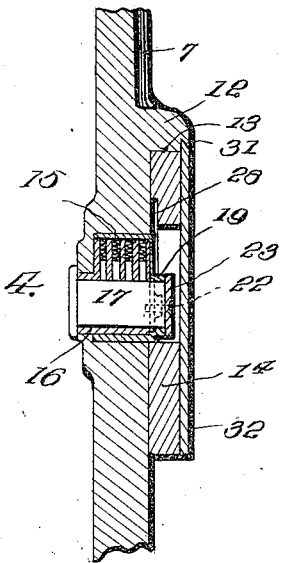
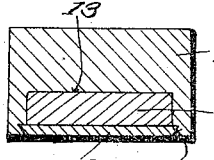
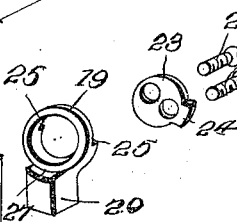
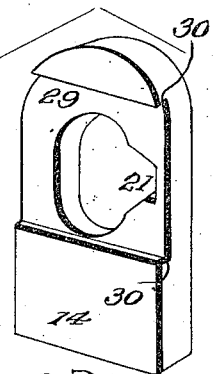
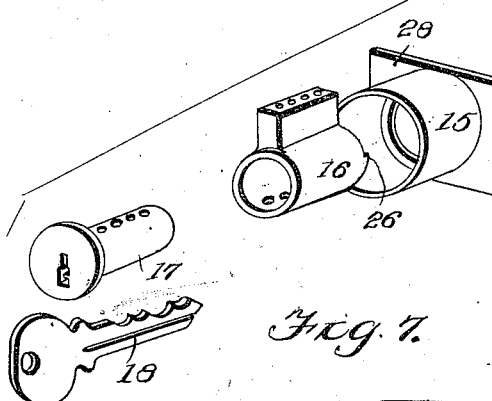
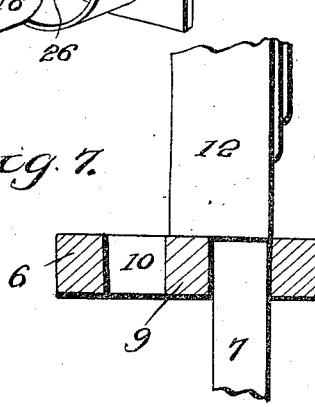
Witnesses
Ferdinand Espey
Juana M. Fallin
Inventor
P. B. Walls
By
Attorneys

UNITED STATES PATENT OFFICE.

PERCY B. WALLS, OF LOS ANGELES, CALIFORNIA.

LOCK FOR GEAR-LEVERS.

1,136,568.   Specification of Letters Patent.   Patented Apr. 20, 1915.

Application filed July 28, 1911, Serial No. 641,033. Renewed February 18, 1915. Serial No. 9,175.

*To all whom it may concern:*

Be it known that I, PERCY B. WALLS, citizen of the United States, residing at Los Angeles, in the county of Los Angeles and State of California, have invented certain new and useful Improvements in Locks for Gear-Levers, of which the following is a specification.

This invention relates to locking devices for automobiles and other vehicles and has for its object the provision of a comparatively simple and thoroughly efficient device of this character, by means of which the controlling lever of a motor vehicle may be securely locked in neutral position so as to prevent an unauthorized person from starting the car.

A further object of the invention is generally to improve this class of devices so as to increase their utility, durability and efficiency.

Further objects and advantages will appear in the following description, it being understood that various changes in form, proportions and minor details of construction may be resorted to within the scope of the appended claim.

For a full understanding of the invention and the merits thereof, reference is to be had to the following description and accompanying drawings, in which:

Figure 1 is a side elevation of a portion of an automobile, showing the controlling lever with locking mechanism constructed in accordance with the present invention; Fig. 2 is a perspective view of the sector detached, showing the controlling lever locked in neutral position; Fig. 3 is a rear elevation of the controlling lever with the slide removed, showing the construction of the locking mechanism; Fig. 4 is a vertical sectional view taken on the line 4—4 of Fig. 3, the closure or plate being shown in position on the lock casing; Fig. 5 is a transverse sectional view taken on the line 5—5 of Fig. 3; Fig. 6 is a perspective view of the several elements comprising the lock detached; Fig. 7 is a transverse sectional view, showing the locking bolt retracted and the controlling lever in position to move freely within the adjacent slot of the sector; Fig. 8 is a side elevation illustrating a modified form of the invention.

Corresponding and like parts are referred to in the following description and indicated in all the views of the drawings by the same reference characters.

The improved locking mechanism forming the subject matter of the present invention is principally designed for attachment to the gear levers of automobiles, motor vehicles and the like and by way of illustration is shown in connection with a portion of an automobile of the ordinary construction in which 5 designates the frame, 6 the guide or sector, and 7 the controlling lever, having its lower end operating within the sector, as shown. The sector is formed with an H-shaped slot defined by an intermediate partition 9 defining oppositely disposed slots 10 for the reception of the adjacent end of the lever 7, there being a transverse slot 11 in the partition 9 and forming a source of communication between the slots 10 so as to permit the lever to be shifted laterally from one slot to the other, to regulate the speed of the machine.

One side of the lever 7, immediately above the upper edge of the sector 6, is provided with a lateral enlargement 12 having a chamber 13 formed therein and in which is slidably mounted a locking bolt 14. Communicating with the chamber 13 and opening on that side of the lever opposite the enlargement 12, is a recess, in which is mounted a lock casing 15. Arranged within the casing 15, is a tubular member 16, in which is rotatably mounted a barrel 17, the latter being provided with a seat for the reception of a key, indicated at 18. The inner end of the barrel 17 projects laterally a short distance beyond the adjacent end of the tubular member 16 to form a support for a disk or tumbler 19, the latter being provided with a peripheral lug 20 adapted to enter a recess 21 in the locking bolt 14, and thus move said bolt to extended and retracted positions when the barrel is rotated.

Rigidly secured to the inner end of the barrel 17, by screws or similar fastening devices 22, is a plate or disk 23 having a lug 24 which engages the lug 20 on the tumbler 19 and serves to move said tumbler into and out of engagement with the locking member 14. The lower edge of the tumbler 19 is cut away to form oppositely disposed shoulders 25, there being a lug or projection 26 formed on the inner end of the casing 16 for limiting the rotary movement of said tumbler. The inner face of the lug 20 is preferably cut-away at 27 to accommodate the disk 23 so as to allow rotation of the disk with the barrel until the lug 24 on the disk engages the lug 20 on the tumbler, when the tumbler will be actuated to extend or retract the locking bolt, as before stated.

A plate 28 is preferably secured to the bottom of the chamber 13, there being a recess 29 formed in the adjacent face of the locking bolt 14 to receive said plate, said recess defining oppositely disposed shoulders 30 which, by engagement with the plate 28, serve to limit the longitudinal movement of the locking bolt in either direction. The side walls of the chamber 13 are provided with guiding recesses 31, preferably undercut in cross section to permit the insertion of a slide or closure 32, the latter being preferably soldered or otherwise rigidly secured to the lever so as to prevent an unauthorized person from tampering with the locking mechanism.

It will here be noted that the lever 7 is of substantially the same thickness as the width of the slots 10, so that when the lever is in neutral position and the locking member 14 moved to extended position, it will be impossible to shift the lever along either slot, thereby effectually locking the lever in neutral position and preventing an unauthorized person from starting the car when the latter is left standing for any considerable period. It will also be noted that the construction of the lock is such that the key 18 may be removed from said lock when the bolt is in either retracted or extended position.

In operation, the free end of the lever 7 is moved either to the right or left, until the intermediate portion thereof registers with the central transverse member of the H-slot or neutral point on the sector, after which the lever is moved laterally until it enters said transverse member. The key 18 is then inserted in the lock and rotated so as to lower the locking member 14 and thereby prevent the lever from being moved along either slot, as before stated. By retracting the bolt, the lever will be free to operate in either slot to control the speed of the machine.

It will here be noted that the inner face of the bolt 14 bears flush against the adjacent face of the lever and enters the slot 10, thus dispensing with the employment of locking notches, keepers and similar auxiliary devices for engagement with the bolt when the latter is in extended position. It will further be noted that when the locking member 14 is in retracted position, the lug 20 engages the adjacent wall of the recess 21 in said bolt and thus prevents downward movement thereof.

In Fig. 8 of the drawings, there is illustrated a modified form of the invention, in which the locking mechanism is mounted in a separate casing 33, and the latter attached by screws or similar fastening devices directly to one side of the controlling lever, the construction and operation of the lock being otherwise similar to that shown in Fig. 3 of the drawings. A lock constructed in accordance with this invention, cannot be locked automatically and can be operated only by the application of the key when the controlling lever is in neutral position so that accidental locking of the lever during the travel of the vehicle cannot occur.

While the locking mechanism is principally designed for securing the controlling or gear levers of automobiles in neutral position, it will of course be understood that the lock may be used for other purposes or wherever a device of this character is found desirable or applicable, without departing from the spirit of the invention.

Having thus described the invention, what is claimed as new is:

The combination of a sector having spaced longitudinal slots and a transverse slot connecting said longitudinal slots, a controlling lever operating within either longitudinal slot and movable bodily through the transverse slot, said transverse slot defining the neutral position of the lever, a locking member mounted on the lever, and mechanism housed within the lever and connected with the locking member whereby said member may be projected into the transverse slot or one of the longitudinal slots when the lever is in neutral position and will be prevented by a solid portion of the sector from being projected when the lever is out of neutral position.

In testimony whereof, I affix my signature in presence of two witnesses.

PERCY B. WALLS. [L. S.]

Witnesses:
 JOHN W. UNDERWOOD,
 RAY FISCHER.